United States Patent [19]

Alfano et al.

[11] Patent Number: 4,464,761
[45] Date of Patent: Aug. 7, 1984

[54] CHROMIUM-DOPED BERYLLIUM ALUMINUM SILICATE LASER SYSTEMS

[76] Inventors: Robert R. Alfano, 3777 Independence Ave., Bronx, N.Y. 10463; Janusz M. Buchert, 29 Chittenden Ave., New York, N.Y. 10033

[21] Appl. No.: 332,258

[22] Filed: Dec. 18, 1981

[51] Int. Cl.³ .............................. H01S 3/16
[52] U.S. Cl. .............................. 372/41
[58] Field of Search .............................. 372/39–41, 372/18, 53, 51, 26, 100, 103, 66, 67, 12

[56] References Cited

PUBLICATIONS

Goodwin, "Maser Action in Emerald," (1961), *J. App. Phys.* 32, No. 8, pp. 1624–1625.
Shand, "A Tunable Emerald Laser," (Nov. 1982), *IEEE J. of Quant. Elect.*, vol. QE-18, No. 11.

*Primary Examiner*—William L. Sikes
*Assistant Examiner*—Léon Scott, Jr.
*Attorney, Agent, or Firm*—Irving M. Kriegsman

[57] ABSTRACT

A laser system in which the laser medium is a single crystal of $Be_3Al_2Si_6O_{18}:Cr^{3+}$ (Emerald) is disclosed. Because of its wide fluorescent bandwidth, the material is suitable for high intensity, tunable, mode-locked pulses with durations as short as 10–500 femtoseconds. A number of different laser systems containing this laser medium are described.

15 Claims, 11 Drawing Figures

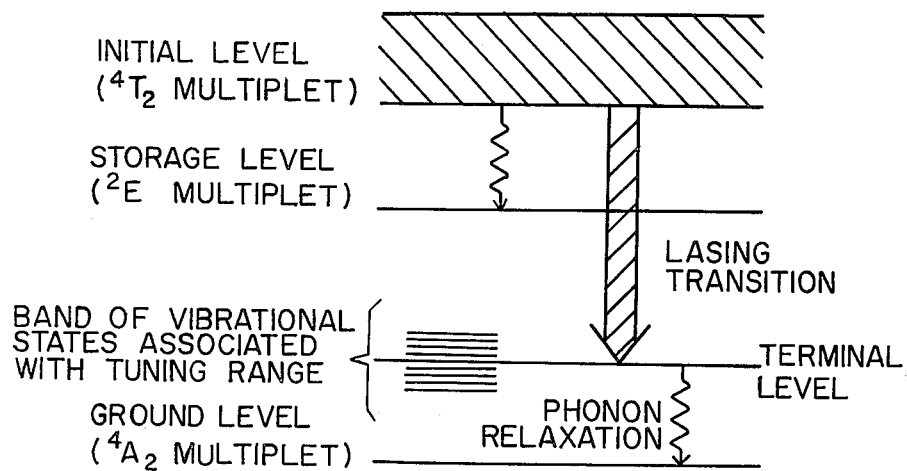
FIG. 2 VIBRONIC LASING MODEL
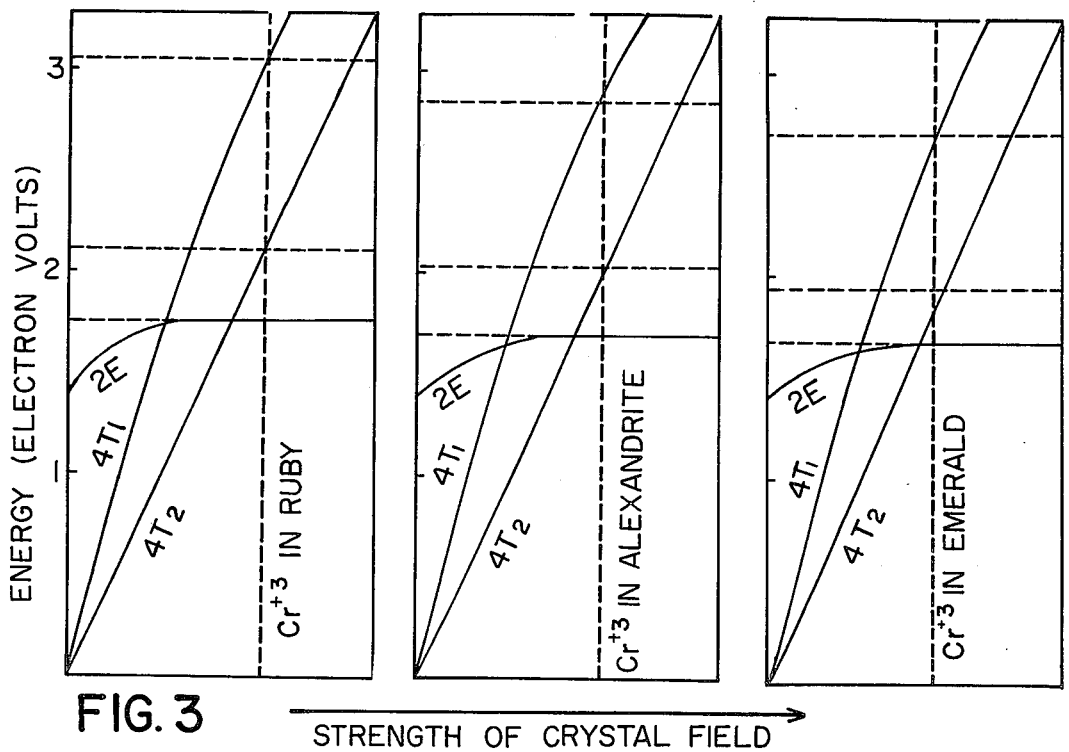
FIG. 3
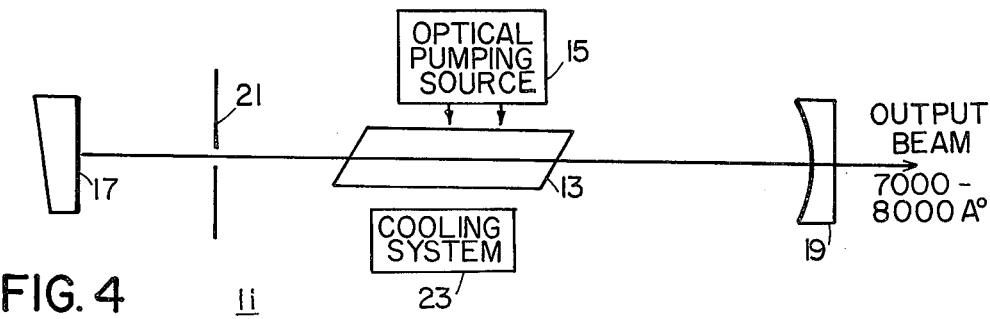
FIG. 4

FIG. 5
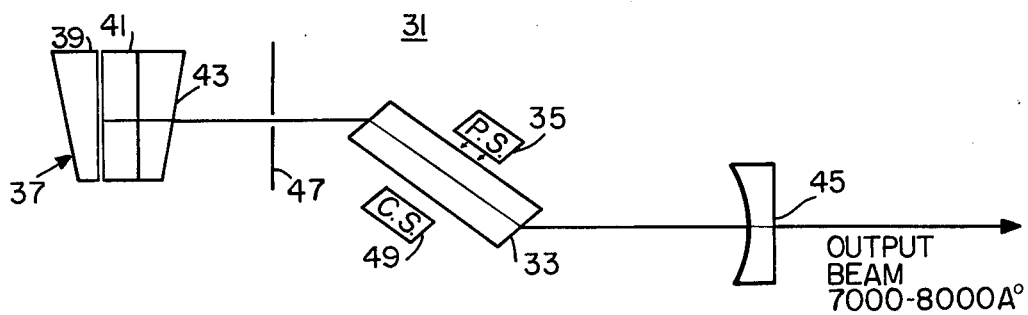
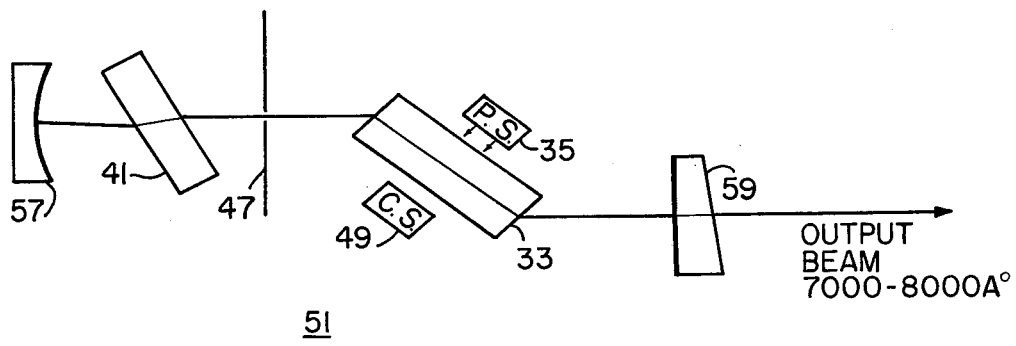
FIG. 6

CHROMIUM-DOPED BERYLLIUM ALUMINUM SILICATE LASER SYSTEMS

BACKGROUND OF THE INVENTION

The present invention relates generally to lasers and more particularly to a laser in which the laser medium is a single crystal of chromium-doped beryllium aluminum silicate (Emerald).

The use of lasers in science and industry has received wide acceptance in an ever increasing variety of applications. Lasers have found use in such diverse areas as range finding apparatus, optical surgery, optical printers, optical readers and metal drilling. Briefly, lasers operate on the principle of light amplification through stimulated emission of radiation and can create extremely intense concentrations of light. The coherent light beam produced in a laser cavity is amplified in a laser material. Materials which have been used as laser hosts include gases, liquids, glasses and single crystalline solids.

When single crystalline solids are utilized in lasers, the crystals are generally in the form of elongated rods. The structure of the crystalline material must be very nearly perfect, since any optical inhomogeneities will cause distortion and scattering of the laser beam and thereby reduce the intensity and coherence of the radiation. Imperfections in the crystal which adversely affect lasing performance include elastic strain, crystal misorientations, chemical concentration inhomogeneities, dislocations, inclusions and bubbles.

The first room temperature single crystal solid laser, disclosed several years ago, utilized $Al_2O_3Cr^{3+}$ (Ruby). In more recent developments, room temperature lasers have been fabricated from rare earth ion-doped materials. Examples include $Y_3Al_5O_{12}:Nd^{3+}$ (YAG:Nd) and $Y_2Al_2O_6:Md^{3+}$ (YALO:Nd).

During the past ten years, ultrafast (i.e. picosecond) laser pulses have been generated in the visible and infrared spectral region by passive and active mode-locked Ruby, neodynium and dye laser systems. The current solid state picosecond laser systems are not tunable and the pulse duration is limited by the spectral characteristics of the lasing material. There is a need for high power tunable picosecond laser source. The availability of high intensity, tunable, subpicosecond pulses can be used to investigate a variety of phenomena such as optically generated plasmons, optical radar, optical computers, high speed photography, optical and vibrational spectroscopy of liquids, solids and gases, semiconductor properties, nonlinear properties of materials, transient responses of optical and electronic instruments.

The types of materials commonly used in the solid state laser are in the form of glasses (such as silicate or phosphate) or crystals doped with such ions as $Cr^{3+}$ or $Nd^{3+}$. As is known, there are certain conditions that the laser material must fulfill to generate short pulses, namely, wide fluorescence bandwidth, high quantum yield, and strong and broad absorption bands in the visible. Ruby is a three level material (Sapphire $Al_2O_3$ in which a small percentage of $Al^{3+}$ has been replaced by $Cr^{3+}$) which lases in the visible at 694.3 nm. The bandwidth, however, is very narrow i.e. about 0.5 Å, due to the crystalline structure of the material (lasing at R lines). This sets a lower limit to the pulse duration of 20-30 picoseconds. The other commonly used doping material, $Nd^{3+}$, is generally either in crystalline host like Yttrium Aluminium Garnet (YAG) or in glass (silicate or phosphate). All three $Nd^{3+}$ doped materials (YAG, silicate and phosphate) lase in the infrared around 1060 nm with durations of 30, 8 and 6 picoseconds, respectively. Dye laser systems (laser systems in which the laser material is an organic dye) generally lase in visible and can generate subpicosecond pulses around 600 nm. (for Rhodamine 6G). However, the very low power emitted from such lasers require the use of a complicated amplifier system. In addition, dye lasers essentially cannot be Q-switched.

In U.S. Pat. No. 3,997,853, to R. C. Morris et al there is disclosed a laser in which the host comprises a single crystal of beryllium aluminate ($BeAl_2O_4$) doped with trivalent chromium ions, the single crystal being crystallographically oriented substantially along the a-c plane, at least 30° removed from the b-axis, and having a chromium doping concentration ranging from about 0.005 to 1.0 atom percent.

In U.S. Pat. No. 4,272,733, to J. C. Walling etc., there is disclosed a high power, broadly wavelength-tunable laser system which comprises as the laser medium particular single crystals of chromium-doped beryllium aluminate ($BeAl_2O_4:Cr^{3+}$) having the chrysoberyl structure, means for exciting the laser medium and tuning means. The laser may be operated over a broad temperature range from cryogenic temperatures to elevated temperatures. Elevated temperatures are preferred, however, since they result in higher laser gain. Emission is in a spectral range from red to infrared, and the laser is useful in the fields of defense, communications, isotope separation, photochemistry, etc.

In U.S. Pat. No. 4,019,156, to W. D. Fountain there is disclosed a Q-switched/mode-locked Nd:YAG laser oscillator employing simultaneous active (electro-optic) and passive (saturable absorber) loss modulation within the optical cavity is described. This "dual modulation" oscillator can produce trasform-limited pulses of duration ranging from about 30 psec to about 5 nsec with greatly improved stability compared to other mode-locked systems. The pulses produced by this system lack intrapulse frequency or amplitude modulation, and hence are ideally suited for amplification to high energies and for other applications where well-defined pulses are required. Also, the pulses of this system have excellent interpulse characteristics, wherein the optical noise between the individual pulses of the pulse train has a power level well below the power of the peak pulse of the train.

In an artical entitled Color by Kurt Nassau appearing in Scientific American, October 1980, Volume 243, Number 4, pp. 124-156, various properties of Ruby, alexandrite and Emerald are discussed.

SUMMARY OF THE INVENTION

It is an object of this invention to provide a new and improved laser.

It is another object of this invention to provide a new and improved laser material.

It is still another object of this invention to provide a new and improved chromium doped laser material.

It is yet still another object of this invention to provide a new and improved solid state laser which can be broadly tuned and which can produce short pulses having durations in the picosecond and femtosecond range.

According to the teachings of the present invention there is provided a laser which comprises a laser medium comprising a single crystal of beryllium aluminum silicate doped with trivalent chromium ions ($Be_3Al_2Si_6O_{18}:Cr^{3+}$), means for exciting said laser medium to emit coherent radiation, and an optical resonant cavity for supporting coherent radiation emitted by the laser medium.

According to one feature of the invention the laser may include tuning means within the optical resonant cavity for tuning the laser over a range of frequencies and according to another feature of the invention the laser may include mode locking means for producing mode locking operation. The laser material may be made either in a rod type or a disc type configuration. The chromium doping is in the range of 0.01 to 0.5 atom percent.

A number of different laser system configurations employing the novel laser material are disclosed.

For a better understanding of the present invention, together with other aid further objects thereof, reference is made to the following description taken in conjunction with the accompanying drawings and its scope will be pointed out in the appended claims.

BRIEF DESCRIPTION OF THE DRAWINGS

In the drawings wherein like reference numberals represent like parts:

FIG. 2 is a 4 level vibronic lasing model for Emerald;

FIG. 3 is a graph which shows the effect of the strength of the crystal electric field on the electronic states of the Cr ions in the crystal structure for Ruby, Alexandrite and Emerald;

FIG. 4 is a schematic illustration of a laser system constructed according to the teachings of the present invention;

FIG. 5 is a schematic illustration of a mode locked laser system constructed according to the teachings of the present invention;

FIG. 6 is a schematic illustration of an another mode locked system constructed according to the teachings of the present invention;

DETAILED DESCRIPTION OF PREFERRED EMBODIMENTS

Figure 1A:
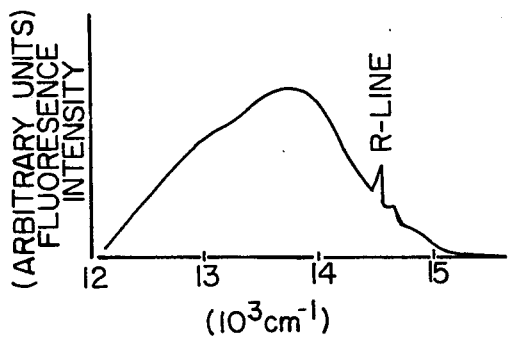
FIG. 1 parts (a), (b) and (c) are graphs illustrating the room temperature fluorescence of Emerald, Alexandrite and Ruby respectively; and part (d) is a graph of the absorption spectra of Emerald.
Figure 1B:
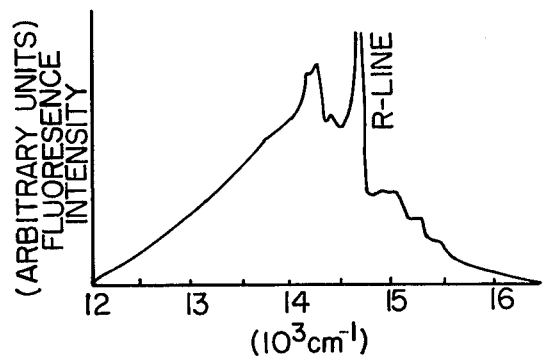
Figure 1C:
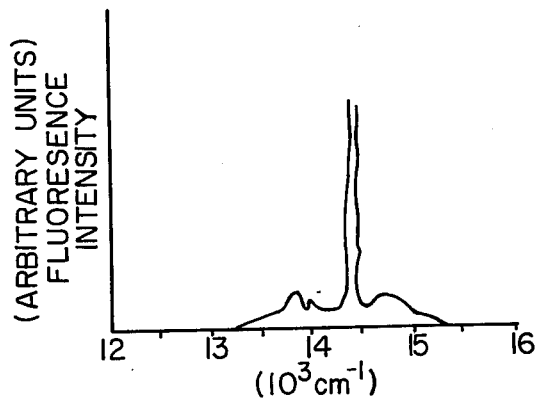
Figure 1D:
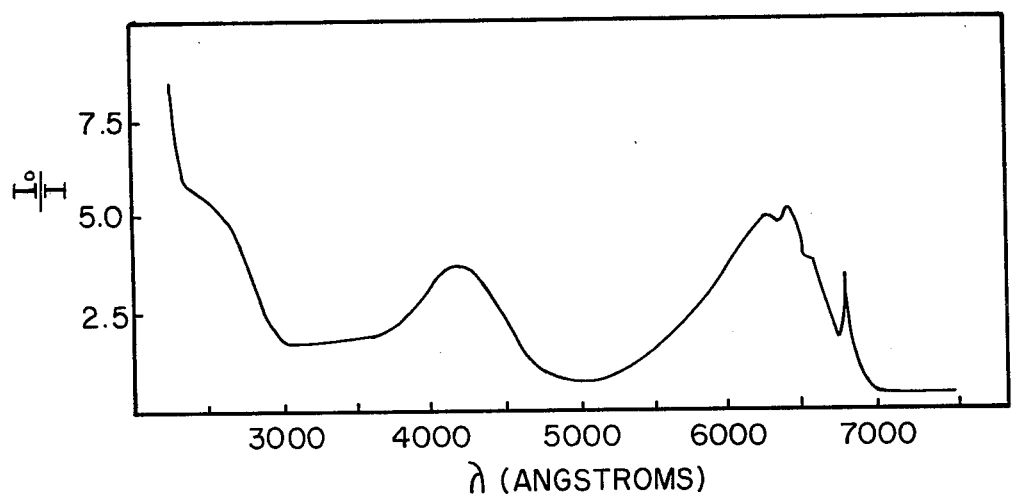

The present invention is directed to a laser system in which the laser material is chromium doped beryllium aluminum silicate $Be_3Al_2Si_6O_{18}:Cr^{3+}$ (Emerald).

$Be_3Al_2Si_6O_{18}:Cr^{3+}$ has a wide fluorescent bandwidth, 700-850 nm at room temperature and is an excellent material for laser action and short pulse generations.

One of the important advantages of using this material as a laser material is that it emits light over a very broad band and can thus be made tunable. Another important advantage of this material is that it can be mode locked using relatively slow saturable dyes as saturable absorbers. A graph illustrating the room temperature fluorescence of Emerald is shown in FIG. 1 (a) and (for comparison) a graph illustrating the room temperature fluorescence of Alexandrite is shown in FIG. 1 (b), and the fluorescence of Ruby in FIG. 1 (c). As is known, the spectrum becomes wider and more prominent as the temperature increases. A graph showing the absorption spectra of Emerald is shown in FIG. 1 (d).

The wide bandwidth will result in producing very short picosecond and possibly subpicosecond pulses, tunable in visible and near infrared region with the high intensity of a laser beam. The laser action comes from the 4 level vibronic lasing model which is illustrated in FIG. 2. Emerald is similar in electronic structure to Ruby and Alexandrite, but is a superior laser material to Alexandrite ($BeAl_2O_4:Cr^{3+}$) in many ways (see Table I). The broad absorption spectra of Emerald is visible up to 700 nm, which allows the possibility of pumping by readily available flashlamps, or by suitable lasers source as the argon, krypton laser of SHG from a Yag laser system. Because the upper laser level of Emerald is phonon coupled to the crystal lattice, raising in temperature increases the inversion population above the ground state. The result is a major improvement in gain with temperature for the vibronic mode. The crystal field that sets the energy side of the chromium ions in Emerald is weaker than that in Alexandrite.

The energy states modified by the crystal electric fields for Ruby, Alexandrite and Emerald are illustrated in FIG. 3, parts (a), (b) and (c).

The electric field in a crystal alters the states of ions within the crystal structure. In the materials (illustrated in FIG. 3) an excited ion can return to the ground state through an intermediate legel designated 2E (R-lasing in Ruby) or in accordance with the Boltzman partition function. If the difference between $4T_2$ and 2E is smaller this distribution pushes the occupancy probability toward the higher levels and one increases can be obtained in the emission cross section from $4T_2$ multiplied to the band of vibrational states coupled with ground level ($4A_2$)-Ruby>Alexandrite>Emerald.

The most significant difference of Emerald to other chromium doped materials is in the nature of the chemical bonds, which are less ionic by a few percent, so that the magnitude of the electric field surrounding a chromium ion is somewhat reduced. As a result, the two 4T levels lie at slightly lower energies; the position of the 2E band is essentially unaltered. Therefore, Emerald can exhibit a great increase of the inversion population of vibronic modes above the ground state at room temperature. This gives an increase of the emission cross section, raising the gain and lowering the lasing threashold as compared with Alexandrite and Ruby lasers (see Table I). Emerald exhibits wide fluorescence and is a useable output for laser action for all wavelengths from 700 to 800 nm and can yield spectral limited mode-locked pulses having theoretical limits of 10 to 20 femtoseconds using one of the known adequate saturable cyanine dyes. The best quantum yield rod which is made along the C-axis, and to improve polarization properties of laser beam (fluorescence is already polarized), the Brewster-Brewster angle should be made for polarization along the b-axis of the crystal.

There are two conventional ways to obtain ultrafast laser actions in a laser cavity using bleachable dye type saturable absorbers.

In one technique, which is used mainly with glass, Ruby and solid state lasers, the dye operates as a very fast shutter adjustable to roundtrip frequency. For example Neodymium or Ruby lasers use dye absorptions obtained from Eastman Kodak 9860 dye #5 or DDI which absorbtion maxim occur near the laser emittion wavelengths. Bleaching of the excited state S*, of dye due to high intensity of laser pulses and gain of laser medium produces the short pulses. The fast recovery time from this level reduces the Q-factor of cavity. The duration of the pulses in this case are dependent on how fast the dye can recover. The technique is applicable to Emerald.

The other technique, which is used with dye lasers is related to two properties of dyes, namely, bleaching and lasing. This technique, however, is also applicable to Emerald. Due to the fast bleaching dye one can have very fast risetime of single pulse. Lasing action and gain saturation transition between vibrational states in Emerald make possible a very fast decay time of a single pulse under conditions of initial level. For this technique, the dye used can have a long recovery time, only shorter than the cavity roundtrip time, e.g. 5–8 nsec. This method has been used for dye lasers.

It is also possible to obtain short pulses in Emerald by using the excited states absorption recovery transitions between $4T_2$ level upper $nT$, vibrational bands. The relaxation of these transistions between electronic states are very short i.e. less than about 1 psec and probably as fast as a few femtoseconds. This transition will cause self mode locking of the laser emission. Since Emerald is homogeneously broadened, etalons can reduce the bandwidth by orders of magnitude with little loss in power.

In Table 1 there is illustrated the lasing characteristics and lasing thresholds of Emerald and other laser materials.

It is shown in Table I, the calculated values for the number $N_{th}$ of ions required in the metastable state, fluorescence power $P_f$ threshold for a standard laser cavity (length of optical resonator $l=20$ cm and $\gamma=2$ percent-loss per pass) and the minimum absorbed pumped energy $E_{min}$ required to achieve the threshold condition for standard losses $\eta$ (5 percent of the exciting light energy falls within the useful absorption band, 5 percent of this light is absorbed by the laser medium, that the average ratio of laser frequency to the pump frequency is 0.5, and the lamp efficiency [optical output/electrical input] is 0.5). The theoretical lasing formulas are given in the top of the Table headlines.

TABLE 1

| Lasing material | $N_{th}^{4lev} = \frac{8\pi\tau o n^3 \Delta v}{c \tau c \lambda^2}$ $N_{th}^{3lev} = \frac{N_o}{2}$ | $P_f = \frac{N_{th} \cdot h \cdot v}{\tau o}$ [W/cm³] | $E_{min} = \frac{N_{th} h v}{\eta}$ [J/cm³] |
|---|---|---|---|
| Ruby tree level $\lambda = 694.3$ nm $\Delta v = 11$ cm$^{-1}$ $\tau o = 3.10^{-3}$ sec | $10^{19}$ | 960 | 4600 |
| Nd$^{3+}$ Glass four level $\lambda = 1.06\mu$ $\Delta v = 200$ cm$^{-1}$ $\tau o = 3.10^{-4}$ sec | $9.10^{15}$ | 5.6 | 2.7 |
| Nd$^{3+}$ YAG four level $\lambda = 1.064\mu$ $\Delta v = 6$ cm$^{-1}$ $\tau o = 5.5 \cdot 10^{-4}$ sec | $2.10^{15}$ | .7 | .6 |
| Alexandrite four level $\lambda_{Ave} = 720$ nm $\Delta v = 1000$ cm$^{-1}$ $\tau o = 3.2 \cdot 10^{-4}$ sec | $16.10^{17}$ | 140 | 70 |
| Emerald four level $\lambda_{Ave} = 740$ nm $\Delta v = 1500$ cm$^{-1}$ $\tau o = 6.5 \cdot 10^{-5}$ sec | $4.1.10^{16}$ | 170 | 17 |

$N_{th}^{4lev}$ = population inversion density at threshold in the metastable state for a 4 level system
$N_{th}^{3lev}$ = population inversion density at threshold for a 3 level system
$\tau o$ = decay time associated with radiative laser transistion
$n$ = refractive index
$\Delta v$ = the width of the gain linewidth at room temperature
$\tau c$ = cavity lifetime- the time at which the energy is lost in the laser cavity
$c$ = speed of light
$\lambda$ = lasing wavelength
$N_{th}$ = population inversion density at threshold
$N_o$ = total number of active ions in the crystal
$P_f$ = critical fluorescence power needed for CW laser
$\eta$ = estimated losses in standard laser cavity
$E_{MIN}$ = energy threshold for pulse laser
J = joules
W = watts From Table I it can be seen that the optical energy needed for Emerald to achieve the lasing threshold is about four times smaller than in Alexandrite, 270 times less than Ruby, and 28 times greater than Nd$^{3+}$:YAG. Fluorescence tunability bandwidth over 1500 cm$^{-1}$ is 250 times wider than Nd$^{3+}$ YAG and 1.5 times compared to Alexandrite. All physical properties are as good or better especially for mode-locked action than most other solid state lasers like $Nd^{3+}$ glass and crystal or Ruby, or Alexandrite.

Referring now to FIG. 4, there is illustrated an example of a laser system constructed according to the teachings of the present invention and identified generally by reference numeral 11. Laser system 11 includes a laser medium 13, an optical pumping source 15, an optical resonant cavity made up of a 100% (full) reflecting end mirror 17 and a 50 to 80% (partial) reflecting end mirror 19, an aperture plate 21 located between laser medium 13 and end mirror 17 and a cooling system 23 for regulating the temperature of the laser rod 13, the cooling system 23 being illustrated for simplicity in block diagram form.

Laser medium 13 consists of a single crystal of chromium doped beryllium aluminum silicate ($Be_3Al_2Si_6O_{18}:Cr^{3+}$) with the chromium doping being in the range of about 0.01 to 0.5 atom percent. The crystal is constructed in the form of an elongated rod which is made longitudinal about the c-axis of the crystal. The ends of rod 13 may be cut at a Brewster angle, flat or 6° angle and may be coated with a suitable dielectric anti-reflection coating. Typical dimensions for rod 13 may be ¼ cm. by 4 cm. The crystal may be conventionally grown by any of the various melt growth processes such as hydro-thermal, Verneuil or Czochralski. Pumping source 15 may be any suitable optical pumping source, either incoherent or coherent, continuous wave or pulsed, that will excite the laser medium 13. If a coherent pumping source is used it must have an emission wavelength that is absorbed by the ground state of the $Cr^{3+}$ dopant but not absorbed excessively by the excited state. For example, pumping source 15 may be a xenon lamp or an argon or krypton laser. If pumping source 15 is a laser it may either be positioned about the laser medium (as shown) or along the axis of the cavity outside of one of the end mirrors. End mirror 17 is flat, and preferably wedge shaped as shown, and contains a coating designed for maximum reflectivity over a bandwidth between around 6500-8400 Å. End mirror 19 is curved and contains a similar coating designed for maximum reflectivity over the same bandwidth as end mirror 17. The 6500-8400 Å bandwidth covers the range of frequencies over which coherent light is produced.

If pumping source 15 is a laser and positioned outside the cavity along the axis of the cavity, the end mirror through which the pumping light passes into the cavity is designed for maximum transmissivity at the pumping laser emission frequency. End mirrors 17 and 19 are spaced apart from one another the proper distance to form an optically resonant cavity and rod 13 is located along the focal point of curved end mirror 19. End mirror 19 may have a curvature of between around 1-5 meters and the spacing between the mirrors may be about 1 meter. Instead of mirror 17 being flat and mirror 19 curved, mirror 17 may be made curved and mirror 19 curved, mirror 17 may be made curved and mirror 19 may be made flat. The output radiation, of laser system 11 shown by arrow 25 emanates from end mirror 19. If desired, both mirrors may be made partially reflecting. Cooling system 23 includes a fluid (not shown) which may be air, water or a cryogenic liquid, contained in a tank in communication with a laser mounting head (not shown) through pipes. Aperture plate 21 has an aperture which may be from one to ten millimeters in diameter for single transverse mode operation. Laser 11 operates in a conventional manner (as any solid state laser) and emits radiation over a frequency band around 7000-8000 Å.

Referring now to FIG. 5, there is illustrated a passive mode locked laser system 31 constructed according to the teachings of the present invention and identified generally by reference numeral 31. Laser system 31 includes a laser medium 33, a pumping source 35, an end assembly 37 having an end mirror 39, a dye cell 41 containing a saturable absorber and a window 43, an end mirror 45, an aperture plate 47 and a cooling system 49.

Laser medium 33 is similar to rod 13 with the exceptions being that the ends are cut at Brewsters angle and arranged for polarization along the b-axis and the rod itself aligned along the Brewster's angle rather than being colinear with axis of the cavity. The width of dye cell 41 may be around 100 microns to 2 millimeters. The dye cell 41 contains a saturable dye absorber (i.e. a saturable dye solution) which serves as a passive mode locking mechanism. The dye absorber is preferably a saturable cyananine dye. Examples of saturable cyananine dyes are 11' diethyl 22' dicarbocyanine iodide in methanol and 11' diethyl 24' carboyanine iodide in methanol, which are commonly referred to as DDI and DCI, respectively. Pumping source 35, end mirror 39, end mirror 45, aperture plate 47 and cooling system 49 are the same as the corresponding elements 15,17,19, 21 and 23, respectively, in laser system 11.

In FIG. 6 there is illustrated another embodiment of a mode locked laser system identified by reference numeral 51. Laser system 51 is similar to laser system 31, the differences being that window 43 is omitted, dye cell 41 is positioned between end mirror 57 and laser rod 33 is oriented at about Brewsters angle and has thickness of about ½ to 1 cm. and diameter about 5 cm., the 100% reflecting end mirror 57 is curved with 1 to 10 meter radius of curvature rather than flat and the 50 to 80% output mirror 59 is correspondingly flat and wedge shaped rather than curved. Alternately, mirror 57 may be made flat and mirror 59 made to be curved.

Figure 7:
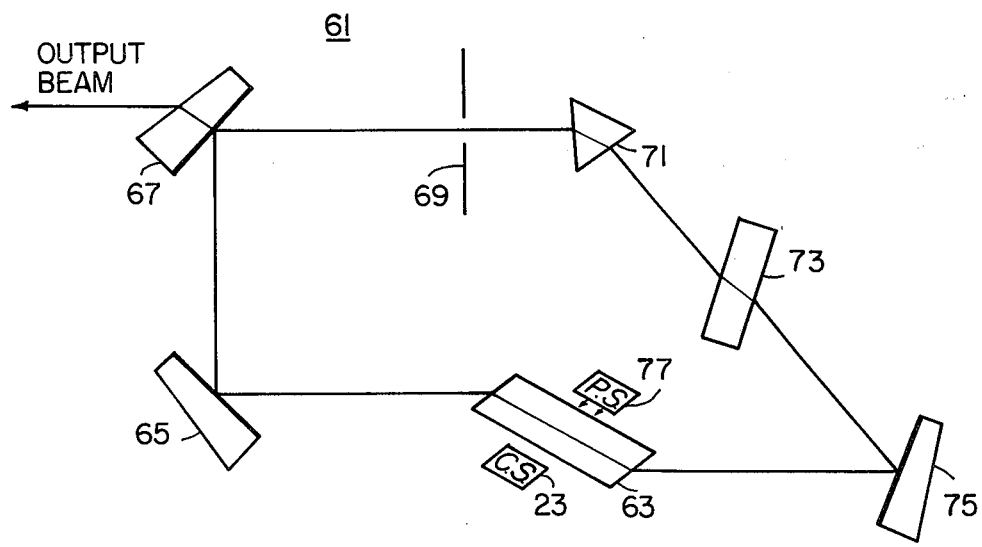
FIG. 7 is a schematic illustration of a tunable mode locked system constructed according to the teachings of the present invention.

In FIG. 7 there is illustrated another embodiment of a mode locked laser system 61 of the present invention in which the laser material 63 is located inside a ring type cavity such as used in a Ruby laser and wherein tuning the output beam.

Laser system 61 includes a laser rod 63 a flat wedge shaped 100% reflecting mirror 65, a flat 50 to 80% reflecting wedge shaped mirror 67, an aperture plate 69, tuning means 71 in the form of a prism, a cell or jet-stream 73 containing a saturable dye absorber such as DDI and another flat 100% reflecting wedge shaped mirror 75 and an optical pumping device 77 in the form of a flash lamp such as xenon. Laser rod 63 is constructed and positioned similar to laser rod 33 in FIG. 5. Mirrors 65 and 75 are similar to mirror 57 in FIG. 6, mirror 69 is similar to mirror 59 in FIG. 6 and aperture plate 69 is similar to aperture plate 47 in FIG. 5.

Figure 8:
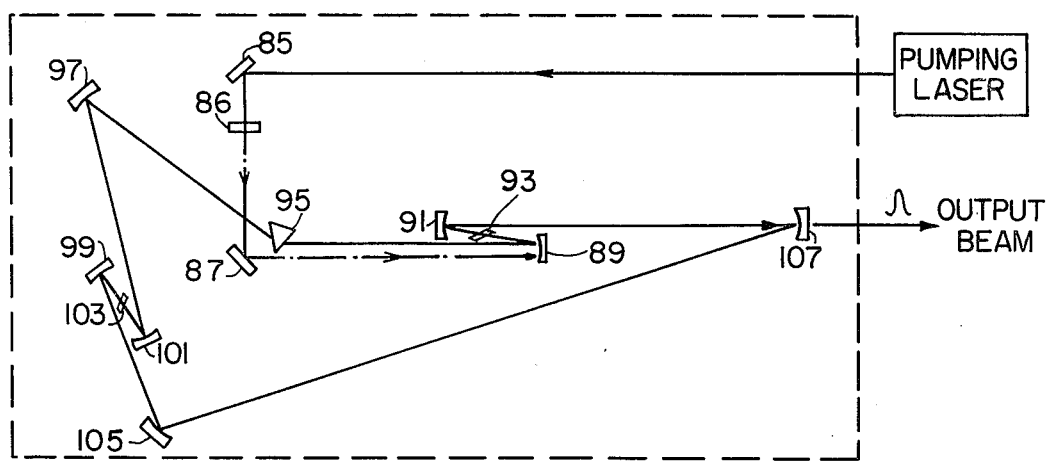
FIG. 8 is a schematic illustration of another tunable mode locked system constructed according to the teachings of the present invention.

In FIG. 8 there is shown another mode locked tunable laser system 81 in which the laser medium is in a ring type cavity similar to that used with a dye laser. System 81 includes a pumping laser 83, such as a SHG Q-switched YAG laser, Excimer laser, nitrogen, CW krypton and CW Argon laser, a 100% reflective flat mirror 85, a ½ wave plate 6 which rotates the plane of polarization to match the polarization of laser 83, a 100% reflective flat mirror 87, a pair of 100% reflective curved mirrors 89 and 91, a laser medium 93 consisting of a single crystal of $Be_3Al_2Si_6O_{18}:Cr^{3+}$ in the form of a disc about ½ cm. in diameter and ¼ to 2 millimeters thick and at the focal point of the two mirrors 89 and 91, a tuning device 95 in the form of a Brewster prism, a 100% reflective flat mirror 97, a pair of curved (focussing) mirrors 99 and 101, a disc shaped dye cell 103 at the focal point of mirrors 99 and 101 oriented at Brewsters angle and containing a saturable absorber dye and two reflective flat mirrors 105 and 107. Mirrors 89, 91, 97, 99 101 and 105 are maxiumum broadband 100% reflecting mirrors from 7000 to 8400 Å for the appropriate angle of incidence. In addition, mirror 89 has 100% reflectivity at the lasing pump wavelengths i.e. for using SHG of YAG, mirror 89 would be reflecting at 5300 Å (note, 100% reflectivity is typically 99.8%). The reflectivity of output mirror 107 is between 94 to 98% over 7000–8400 Å for the angle of incidence of 5 to 10 degrees. The typical radius of curvature of mirrors 91 and 89 is 10 cm. and mirrors 99 and 101 is 5 cm. The laser medium 93 and the absorber 103 are oriented at Brewsters angle.

Although a particular embodiment of the invention has been described and illustrated herein, it is recognized that modifications and variations may readily occur to those skilled in the art and consequently, it is intended that the claims be interpreted to cover such modifications and equivalents.

What is claimed is:

1. A laser comprising:
   a. a laser medium comprising a single crystal of beryllium aluminum silicate doped with trivalent chromium ions ($Be_3Al_2Si_6O_{18}:Cr^{3+}$),
   b. optical means for exciting said laser medium to emit coherent optical radiation, and
   c. an optical resonant cavity for supporting coherent radiation emitted by the laser medium.

2. A laser comprising:
   a. a laser medium comprising a single crystal of beryllium aluminum silicate doped with trivalent chromium ions ($Be_3Al_2Si_6O_{18}:Cr^{3+}$), said chromium doping concentration being within the range of about 0.01 and 0.5 atom percent,
   b. means for exciting said laser medium to emit coherent radiation, and
   c. an optical resonant cavity for supporting coherent radiation emitted by the laser medium.

3. The laser of claim 2 and wherein the single crystal of the laser medium is crystographically oriented along its c-axis.

4. The laser of claim 3 and further including mode locking means for mode locking the laser.

5. The laser of claim 4 and wherein said mode locking means comprises a saturable absorber disposed within the optical resonant cavity.

6. The laser of claim 5 and wherein said saturable absorber is a cyanine dye.

7. The laser of claim 3 and further including tuning means for tuning said coherent radiation emitted by said laser medium.

8. The laser of claim 7 and wherein the tuning means is a Brewster prism located within the optical resonant cavity.

9. The laser of claim 3 and wherein the optical resonant cavity comprises mirrors designed for maximum reflectivity over a broadband between around 6500 and 8400 Å.

10. The laser of claim 3 and wherein the laser medium comprises an elongated rod of $Be_3Al_2Si_6O_{18}:Cr^{3+}$, the optical resonant cavity comprises a pair of mirrors, one of said mirrors being designed for 100% reflectivity in the range of about 6500-8400 Å and the other mirror being designed for about 50% to 80% reflectivity in the range of about 6500 to 8400 A and the exciting means is a flash lamp.

11. The laser of claim 10 and further including an aperture plate located within said optical resonant cavity.

12. The laser of claim 10 and further including mode locking means disposed within said optical resonant cavity.

13. The laser of claim 10 and wherein the ends of said rod are cut at Brewster's angle, said rod being cut at Brewster's angle in the b-c plane with the optical path along c.

14. The laser of claim 10 and wherein said optical resonant cavity comprises a plurality of mirrors arranged in a ringed type configuration.

15. The laser of claim 3 and wherein the laser medium is in the form of a thin disc or platelet, the optical resonant cavity comprises a plurality of mirrors arranged in a ringed configuration, the exciting means is a pumping laser and the laser includes within the cavity mode locking means and tuning means, the disc being cut at Brewster's angle in the b-c plane with a c along the optical path.

* * * * *